(12) United States Patent
Hayashi

(10) Patent No.: US 7,483,638 B2
(45) Date of Patent: Jan. 27, 2009

(54) OPTICAL TRANSCEIVER

(75) Inventor: Shigeo Hayashi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 505 days.

(21) Appl. No.: 11/369,012

(22) Filed: Mar. 7, 2006

(65) Prior Publication Data

US 2006/0210280 A1 Sep. 21, 2006

(30) Foreign Application Priority Data

Mar. 8, 2005 (JP) .......................... P.2005-064214

(51) Int. Cl.
*H04B 10/00* (2006.01)

(52) U.S. Cl. ........................ 398/135; 398/136; 398/137; 398/138; 398/139; 398/141; 398/115; 398/118; 398/119; 398/128; 398/130; 398/182; 398/192; 398/193; 398/194; 398/195; 398/202; 398/208; 398/209; 398/81; 398/158; 398/159; 398/41; 398/42; 385/88; 385/89; 385/92; 385/93; 372/32; 372/34; 372/36; 372/38.02

(58) Field of Classification Search ................. 398/135, 398/136, 137, 138, 139, 128, 129, 130, 131, 398/115, 118, 119, 120, 41, 42, 79, 141, 398/81, 154, 155, 158, 159, 160, 161, 164, 398/162, 182, 192, 193, 194, 195, 202, 208, 398/209, 210, 214; 385/88, 89, 92, 93; 372/32, 372/34, 26, 38.02

See application file for complete search history.

(56) References Cited

U.S. PATENT DOCUMENTS 5,317,441 A * 5/1994 Sidman ........................ 398/41
6,731,881 B2 * 5/2004 Nomura ....................... 398/135

FOREIGN PATENT DOCUMENTS

JP          2002-335215          11/2002

* cited by examiner

*Primary Examiner*—Hanh Phan
(74) *Attorney, Agent, or Firm*—Smith, Gambrell & Russell, LLP

(57) ABSTRACT

The present invention provides an optical transceiver that enables to reduce the crosstalk from the optical transmitter to the optical receiver. The regenerator of the optical transceiver includes two main amplifiers, a selector, a selector control, and a re-shaper for shaping the receiving signal selected by the selector. The first main amplifier provides a first amplifier and a delay circuit connected in upstream to the first amplifier. The second main amplifier provides a second amplifier and a delay circuit connected in downstream to the second amplifier. The selector selects, based on the phase difference between the receiving signal Rx and the transmitting signal Tx, the output from the first main amplifier or that from the second main amplifier.

8 Claims, 14 Drawing Sheets

OPTICAL TRANSCEIVER

BACKGROUND OF THE INVENTION

1. Field of the Invention

The present invention relates to an optical transceiver used in a full duplex optical communication.

2. Related Prior Art

The current optical communication with a fully duplex function provides an optical transmitter for transmitting an optical signal converted from an electrical signal into an optical fiber, and an optical receiver for generating an electrical signal by converting an optical signal transmitted from another optical fiber. A practical optical transceiver encases these optical transmitter and receiver into a package. The Japanese Patent published as JP-2002-335215A has disclosed a light detecting circuit included within such optical transceiver.

In an optical transceiver, the optical transmitter flows relatively large current to drive a semiconductor optical device, while the optical receiver propagates a relatively small signal output from a semiconductor optical device. Accordingly, the large signal, especially a large current signal, in the optical transmitter causes a crosstalk to degrade the quality of the receiving signal converted by the optical receiver.

The light-receiving circuit disclosed in the Japanese Patent mentioned above adjusts the reference level of the comparator, to reduce the crosstalk from the optical transmitter to the optical receiver, for determining whether the input optical signal exists in the optical receiver. However, the adjustment of the reference level is carried out by a specific circuit. The crosstalk itself is an instant phenomenon; accordingly, it is quite hard to adjust instantly the reference level of the comparator synchronized with the occurrence of the crosstalk. Therefore, the circuit mentioned above would be inapplicable for the optical transceiver with the high speed operation.

The present invention is to solve the subject mentioned above, namely, to provide an optical transceiver that reduce the crosstalk from the optical transmitter to the optical receiver.

SUMMARY OF THE INVENTION

An optical transceiver according to the present invention comprises an optical transmitter, an optical receiver, a phase comparator, and a selector. The optical transmitting includes a light-emitting device and, by receiving a transmitting signal synchronized with a transmitting clock, converts the transmitting signal into an optical signal corresponding to the transmitting signal. The optical receiver includes a light-receiving device and a plurality of main amplifiers. The light-receiving device converts a received optical signal into a receiving signal corresponding to the received optical signal. In the present invention, each main amplifier receives the receiving signal and includes an amplifier and a delay circuit connected in at leas one of upstream and downstream to the amplifier. The delay circuit connected in upstream to the amplifier delays the receiving signal such that the amplifiers in respective main amplifiers receive the receiving signal with timing different from each other, while the delay circuit connected in downstream to the amplifier delays the receiving signal such that each main amplifier outputs the receiving signal with substantially same timing to each other. The phase comparator compares the phase of the transmitting signal and the phase of the receiving signal, and outputs a control signal to the selector control. The selector, controlled by the selector control that receives the control signal, selects one of outputs of the main amplifier.

According to the optical transceiver of the invention, the receiving signal converted from the receiving optical signal by the light-receiving device is sent to respective main amplifiers. Each main amplifier provides the delay circuit and the amplifier, moreover, each delay circuit connected in upstream t the amplifier has different delay time such that the receiving signal reaches the amplifier in respective main amplifiers with different timing from each other.

On the other hand, the noise derived from the optical transmitter superposes on the receiving signal at same timing for respective main amplifiers. Moreover, since the delay circuits connected in downstream to respective amplifiers in the main amplifier delays the receiving signal such that the receiving signal reaches the selector at substantially same timing, the superposed timing for the noise on the receiving signal shifts in respective main amplifiers.

The noise due to the crosstalk from the optical transmitter occurs at edges, the leading and falling edges, of the transmitting signal. Accordingly, by comparing the phase of the transmitting and receiving signals, the timing of the superposition of the noise on the receiving signal, namely, whether the noise is superposed on the receiving signal in the front half of the data bit or the latter half thereof, can be evaluated. The selector of the present invention selects one of the receiving signals each superposing the crosstalk noise in the different timing. Accordingly, the re-shaper circuit connected in downstream to the selector may sample the receiving signal so as to escape a portion where the crosstalk noise is superposed thereon.

Moreover, the optical transceiver may further comprise a monitor circuit configure to monitor the magnitude of the receiving optical signal. In this case, the selector may select one of the main amplifiers based on the magnitude of the receiving optical signal in addition to the phase difference between the receiving signal and the transmitting signal. When the delay circuit is configured by an integrator, the delay time of the delay circuit slightly depends on the magnitude of the receiving optical signal, which enables to recover the receiving signal so as to escape further In still another embodiment of the invention, the optical transceiver may further provide a monitor circuit for monitoring a temperature within the transceiver. The driver for driving the light-emitting device or the delay time of the delay circuit has the temperature dependence in the performance thereof. When the transceiver includes the temperature monitor, the selector may select one of outputs of the main amplifiers based on, in addition to the phase difference between the transmitting and receiving signals, the inside temperature of the transceiver, which enables to recover the receiving signal so as to escape further precisely the portion the crosstalk noise is superposed.

The phase comparator may include a set-reset flip-flop (SR-F/F) and two clock extractor each extracting a transmitting clock from the transmitting signal and a receiving clock from the receiving signal. The SR-F/F receives one of outputs from the clock extractors in the set terminal thereof, while the reset terminal receives the output from the other clock extractor. Thus, the control signal may be obtained in precise.

The phase comparator may include a level decision circuit that decides whether the transmitting clock is in the high level or in the low level when the receiving signal changes the level thereof. According to the level decision circuit above, it is unnecessary to extract the receiving clock from the receiving signal, so the configuration of the phase comparator may be simplified. Moreover, the phase comparator may provide the clock extractor for the transmitting signal.

Still further, the phase comparator may include two clock extractors connected in series and two level decision circuits each corresponding to the clock extractor. The first clock extractor generates a first pulse train triggered by a leading edge of the transmitting signal. Each pulse in the first pulse train has a first pulse width smaller than a bit width of the transmitting signal. The second clock extractor generates a second pulse train triggered by a falling edge of the first pulse train. Each pulse in the second pulse train has a pulse width smaller than the bit width of the transmitting signal. Each level decision circuit decides whether the receiving signal changes the level during from a leading edge to a falling edge immediately after the leading edge of the pulse train output from the corresponding clock extractor or not, and sets an output thereof to be a high level with a preset period.

The phase comparator described above is unnecessary to extract the receiving clock from the receiving signal, which further simplifies the configuration of the phase comparator. Moreover, the pulse width of the second pulse train is preferable to be variable, which enables the optical transceiver of the present invention to be applicable in the optical communication with a multiple transmission rate.

DESCRIPTION OF PREFERRED EMBODIMENTS

Next, preferred embodiments of the present invention will be described as referring to accompanying drawings. In the explanation of drawings and the specification hereinbelow, the same numerals or symbols will refer to the same elements without overlapping explanations.

First Embodiment

Figure 1:
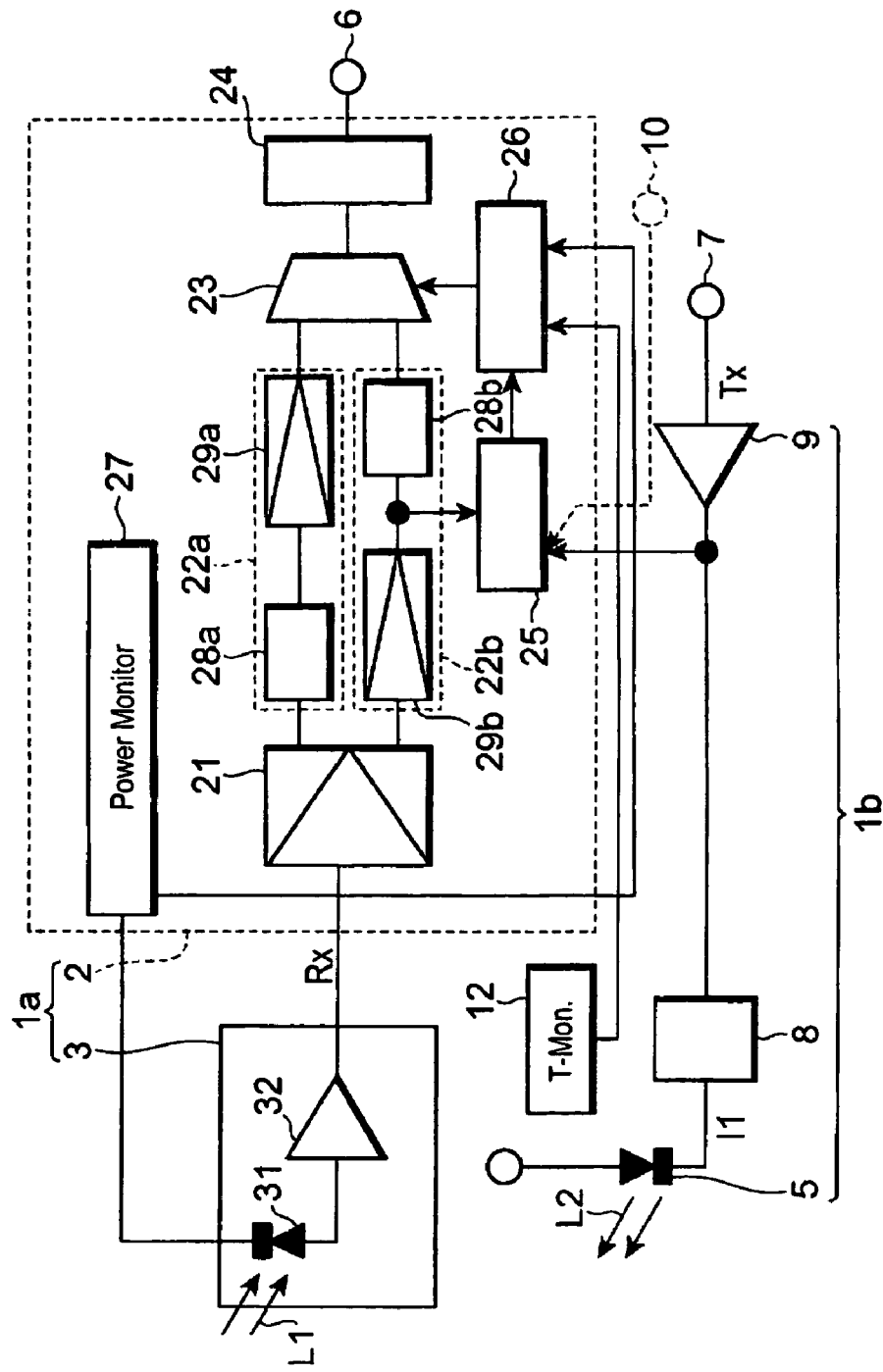
FIG. 1 is a block diagram of an optical transceiver according to the present invention.

FIG. 1 is a block diagram showing an embodiment according to the present invention. Referring to FIG. 1, an optical transceiver 1 of the present embodiment includes an optical receiver 1a, an optical transmitter 1b, an output terminal 6, and an input terminal 7. The optical transceiver 1 may further include another input terminal 10 to receive a clock synchronized with a transmitting data Tx input to the input terminal 7, and a circuit 12 to monitor a temperature within the optical transceiver 1.

The optical receiver comprises a photodiode 31 to convert an optical signal L1 entering through an optical fiber into an electrical signal and an amplifier 32 to amplify this faint signal, and a regenerator 2 configured to amplify this faint signal, to recover a received data, and to output this recovered data in the output terminal 6. The photodiode 31 is installed in a receiving optical sub-assembly (hereinafter denoted as ROSA) 3 with a preamplifier 32 for converting a current signal output from the photodiode 31 into the voltage signal. The ROSA 3 has an electrically conductive package, such as CAN-type package, for EMI-shielding the photodiode and the pre-amplifier to enhance the noise tolerance. The regenerator 2 may be an integrated circuit.

The optical transmitter 1b converts the electrical signal Tx received in the input terminal 7 into an optical signal L2. That is, the optical transmitter 1b includes a laser diode 5, an input buffer 9 configured to amplify the input signal Tx, and a driver 8 to generate a driving current I1, which is supplied to the laser diode 5, by receiving the input signal Tx amplified by the input buffer 9. The laser diode 5 converts this driving current I1 into the optical signal L2 to outputs it outside of the transceiver 1 through an optical fiber.

The regenerator 2 includes a buffer amplifier 21, a plurality of main amplifiers, 22a and 22b, a selector 23, a re-shaper 24, a phase comparator 25, a selector control 26, and a circuit 27 for monitoring the input optical power. The buffer amplifier 21 amplifiers the signal Rx sent from the ROSA 3 and divides the amplified signal into respective main amplifiers, 22a and 22b.

When the pre-amplifier 32 in the ROSA 3 is able to drive the plurality of main amplifiers, 22a and 22b, the buffer amplifier 21 may be omitted and the output of the pre-amplifier 32 is divided into respective main amplifiers, 22a and 22b.

The main amplifiers, 22a and 22b, are connected in parallel with respect to the buffer amplifier 21, or to the pre-amplifier 32 when the buffer amplifier 21 is omitted. The first main amplifier 22a includes a first amplifier 29a and a first delay circuit 28a connected in upstream to the first amplifier 29a. The second main amplifier 22b includes a second amplifier 29b and a second delay circuit 28b connected in downstream to the second amplifier 29b. The first and second delay circuits, 28a and 28b, show substantially same delay time. Accordingly, the main amplifiers, 22a and 22b, each has substantially same configuration regarding to the delay time.

The phase comparator 25 compares the phase of the receiving signal Rx with the transmitting signal Tx. That is, the phase comparator 25 receives the receiving signal Rx from the second amplifier 22b, while receives the transmitting signal Tx from the input buffer 9, and outputs the result of the comparison to the selector control 26. When the transceiver independently provides the other input for the transmitting clock, the phase comparator 25 receives the transmitting clock from this input terminal 10.

Figure 2:
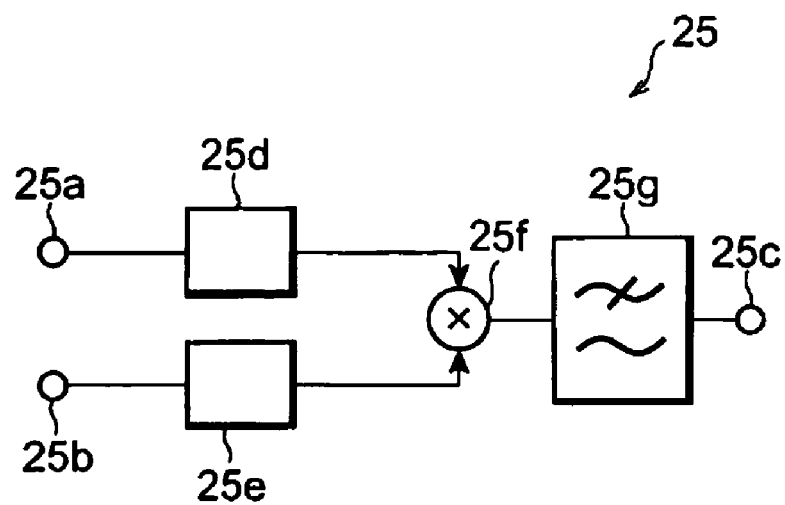
FIG. 2 is a block diagram of the phase comparator according to a first embodiment of the invention.

FIG. 2 describes an example of the phase comparator 25, in which the phase comparator 25 includes a first clock extractor 25d connected to the first input terminal 25a, a second clock extractor 25e connected to the second input terminal 25b, a multiplier 25f connected to both extractors, 25d and 25e, and a low-pass-filter (LPF) 25g connected to the multiplier 25f.

The first clock extractor 25d extracts the transmitting clock from the transmitting data Tx output from the input buffer 9 and received in the input terminal 25a. When the transceiver 1 provides the additional input terminal 10 for the transmitting clock, the first clock extractor 25d may be omitted and the transmitting clock may be directly led to the multiplier 25f. The second clock extractor 25e extracts the receiving clock from the receiving data Rx sent from the second amplifier 22b. The multiplier 25f multiplies respective outputs of two extractors, 25d and 25e, namely, compares the phase of respective clocks, and sends the comparison to the low-pass-filter 25g.

When the transmitting clock and the receiving clock have nearly same frequency, the phase difference therebetween fluctuates with a period far longer than the clock frequency. Therefore, as shown in FIG. 2, to compare two clocks and to filter the result of the comparison may generate a signal whose magnitude depends on the phase difference between two clocks. The output of the low-pass-filter is sent to the selector control 26 as shown in FIG. 1.

Referring to FIG. 1 again, the selector 23 selects one of outputs of the main amplifier 22 under the control of the selector control 26. The selector control 26, based on the comparison between the transmitting clock and the receiving clock, outputs a control signal to the selector 25 to select one of outputs of the main amplifiers 22.

The selector 26 may receive a signal from a circuit 27 for monitoring the input optical power and another signal from the circuit for monitoring the temperature to adjust the control signal output to the selector 25.

The circuit 27 for monitoring the optical input power outputs a signal corresponding to the optical input power, namely, the circuit 27 generates a voltage signal corresponding to a photocurrent generated by the photodiode 31 and sends this voltage signal to the selector control 26.

The circuit for monitoring the temperature includes a temperature dependent device, such as thermistor or junction diode, and generates a voltage signal corresponding to the temperature inside of the transceiver 1 to send it to the selector control 26.

Figure 3:
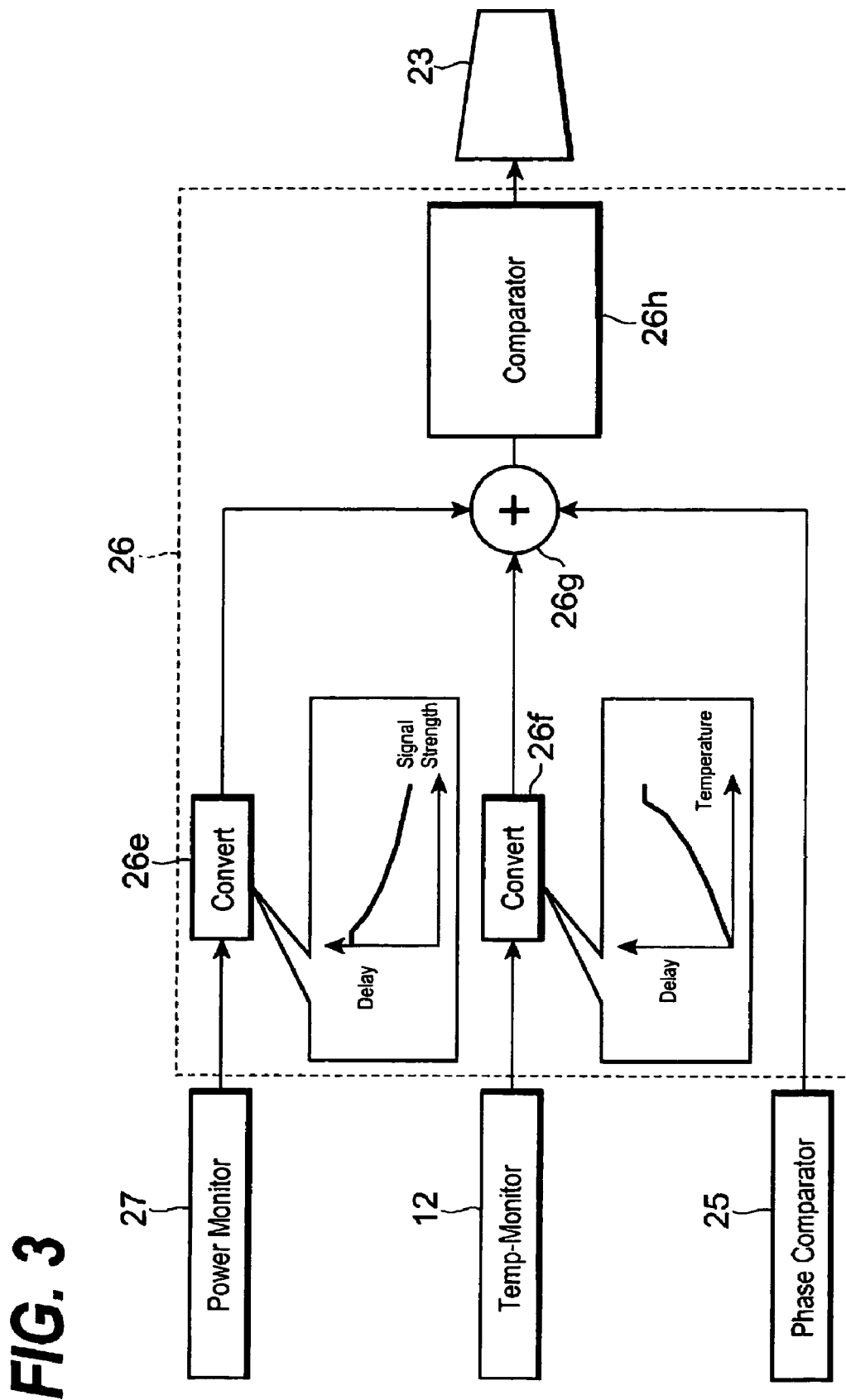
FIG. 3 is a block diagram of the selector control.

FIG. 3 shows an example of the selector control 26. Referring to FIG. 3, the selector control 26 includes converters, 26e and 26f, an adder 26g and a comparator 26h.

The first converter 26e receives the signal from the power-monitoring circuit 27 and converts it into a signal corresponding to a delay time of the second amplifier 29b. The delay time of the second amplifier 29b has a relation of the monotonically decrease with respect to the signal strength entering therein, the converter 26f may be easily constituted by diodes, transistors, and resisters. While, the second converter 26f receives the signal corresponding to the temperature of the transceiver 1 from the temperature monitoring circuit 12 and to convert this signal into a signal corresponding to delay time of respective circuits including the driver 8.

The adder 26g, by adding the signals from respective converters, 26e and 26f, to the control signal from the phase comparator 25, compensates the control signal, namely, the phase difference between the transmitting clock and the receiving clock. The comparator 26h, by comparing the compensated control signal from the adder 26g with a preset value, determines whether the practical phase difference between two signals, Rx and Tx, is greater than the preset value or not, and outputs the result of the comparison to the selector 23, as the final control signal.

When the delay circuits, 28a and 28b, are configured by an integration circuit, the magnitude of the receiving signal Rx affects the delay time. Thus, the present select controller 26 is capable of compensating the signal strength on the delay time, and the selector 23 selects the main amplifiers taking the dependence of the delay time on the signal strength into account, the regenerator 2 can precisely regenerate the receiving signal Rx so as to escape the portion where the crosstalk noise is superposed.

Further, the driver 8, and delay circuits, 28a and 28b, varies their characteristics such as delay time thereof depending on the temperature. The present transceiver 1 provides the circuit 12 for monitoring the temperature, and the selector control 26 may compensate this temperature dependence, the regenerator 2 can precisely regenerate the receiving signal by escaping the portion where the crosstalk noise is superposed.

Referring to FIG. 1 again, the re-shaper 24 reshapes the output of the selector 23. That is, the re-shaper 24 samples the output of the selector 23 by the preset timing, for instance, the timing corresponding to the center of respective bits, and decides the logical level of the sampled bit based on the comparison whether the sampled bit is larger than a preset threshold or not. The re-shaper 24 reshapes the receiving signal Rx and outputs thus re-shaped signal from the output terminal 6.

Figure 4:
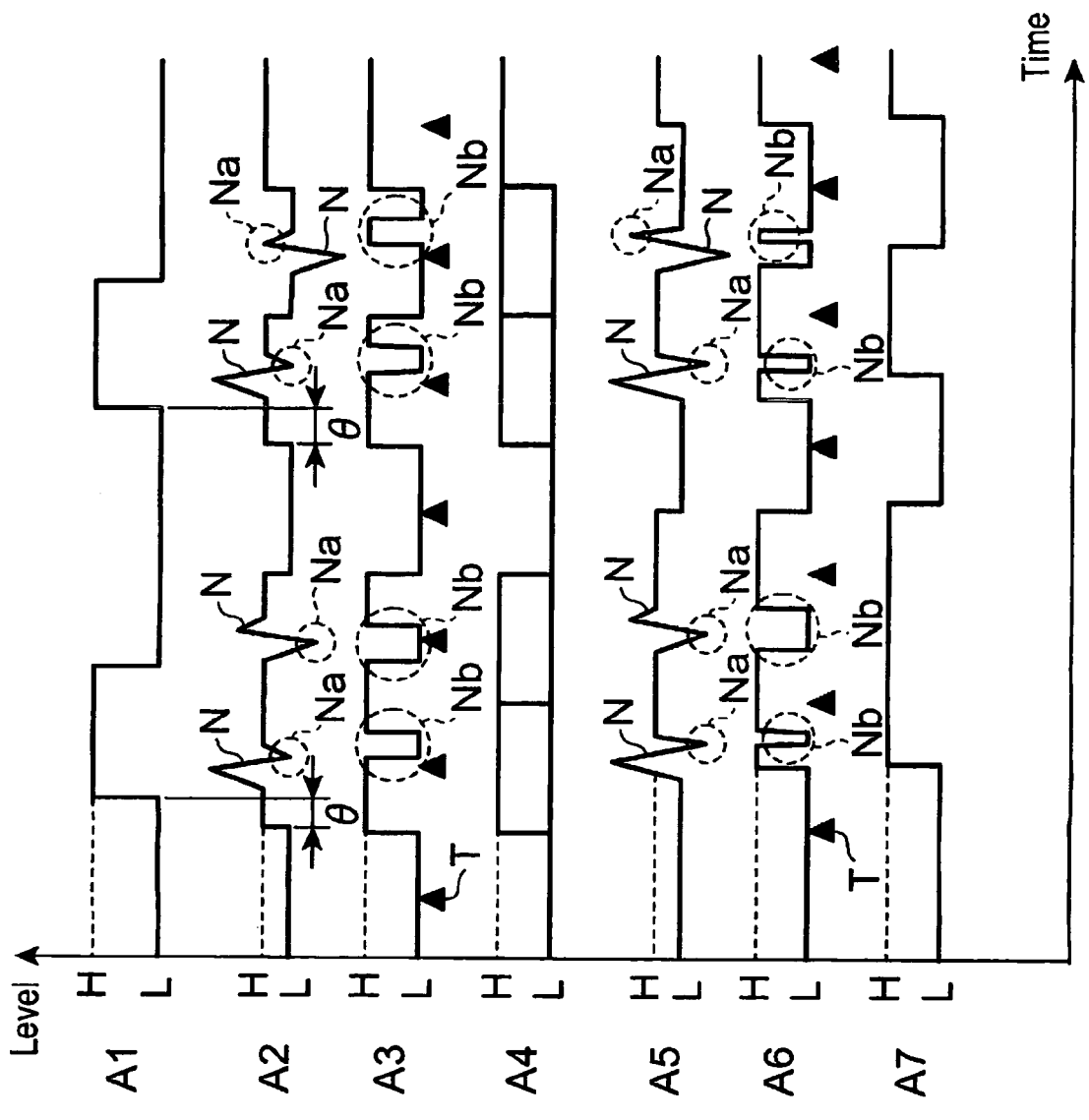
FIG. 4 shows time charts of respective signals within the optical transceiver.

FIG. 4 shows time charts of the optical transceiver 1. The chart A1 depicts the transmitting signal Tx, exactly speaking, the time chart of the current signal output from the driver 8 to the laser diode 5. The chart A2 shows the receiving signal Rx at the input of the second amplifier 29b. It is assumed that the receiving clock attributed to the receiving signal Rx shown in the chart A2 has a phase difference e from the transmitting signal shown in the chart A1. The chart A3 shows the receiving signal Rx at the output of the second amplifier 29b, and the chart A4 shows the receiving signal Rx output from the second amplifier 29b, selected by the selector 23, and re-shaped by the re-shaper 24.

The chart As shows the receiving signal Rx at the input of the first amplifier 29a, the chart A6 shows the signal Rx at the output of the first main amplifier, the chart A7 shows the signal Rx output from the first amplifier 29a, selected by the selector 23, and re-shaped by the re-shaper 23.

As shown in FIG. 4, the timing at the input of respective amplifiers, 29a and 29b, for the receiving signal Rx is different from each other. Fluctuations N appeared in charts A2 and AS caused by the crosstalk noise due to the transmitting signal Tx, which is leaked via the ground line, the power supply line, and/or the radiation. This fluctuation N occurs at the leading edge of the transmitting signal Tx, and is superposed in nearly same time on both main amplifiers, 22a and 22b. Therefore, the timing when the fluctuation N has occurred with respect to the beginning of each data bit is different in respective main amplifiers, 22a and 22b. Specifically, when the noise is superposed on the receiving signal Rx for the second amplifier 29b at nearly middle of each data bit, the noise is superposed at the beginning of each data bit for the first main amplifier 22a, because the receiving signal Rx is delayed in the second main amplifier 22b compared with the first main amplifier 22a.

The first and second amplifiers, 29a and 29b, output the logical "H" signal when the input therein is greater that a preset threshold, on the other hand, output the logical "L" when the input therein is smaller than the threshold, as shown in charts A3 and A6. Due to the noise derived from the transition of the transmitting signal and superposed on the receiving signal Rx at respective amplifiers, 29a and 29b, and the signal occasionally swings to an opposite phase as shown in Na in charts A2 and AS, which results on the incorrect output of the amplifiers, 29a and 29b, shown in FIG. 4.

The symbol T appeared in charts A3 and A6 denotes the timing by which the re-shaper 24 samples the output of the selector 23. As already explained, this timing is generated based on the receiving signal Rx and synchronized with the receiving clock. Although the timings T in charts A3 and A6 are illustrated in different from each other with respect to the receiving signal Rx, because the receiving signal Rx in the second main amplifier 22b is delayed after output from the second amplifier, show in the chart A6, both timings are substantially equal with respect to each data bit of the receiving signal Rx.

In the case that, when the receiving signal Rx output from the amplifier, 29a or 29b, is re-shaped by the re-shaper 24 and the timing T overlaps the incorrect portion that the data is erroneously reversed due to the superposed noise, such as shown by Nb in the chart A3, this portion may be regarded as opposite logic level and reshaped as the incorrect bit, as shown in the chart A4. On the other hand, as shown in the chart A6, when the timing T is escaped from overlapping the incorrect portion Nb, the receiving data Rx can be correctly reshaped as shown in the chart A7.

The present optical transceiver 1 has a plurality of main amplifiers, two main amplifiers in the embodiment shown in FIG. 1, each having different timing for the noise N superposed on the receiving signal Rx. Therefore, at least one of main amplifiers can escape the noise superposition. Since the noise mainly causes at the leading and falling edges of the transmitting signal Tx, the timing of the noise superposition on the receiving signal Rx may be estimated from the phase difference therebetween.

The noise due to the cross talk from the optical transmitter 1b to the optical receiver 1a also appears in the transmission line from the ROSA 3 to the regenerator 2. In particular, when not only the ROSA 3 but also the regenerator 3 has a metal package to shield inside thereof, the transmission line therebetween may be easily affected. For such noise superposed on the receiving signal Rx from the transmitter 1b prior to the delay circuit 28a, the timings appeared on the receiving signal Rx for becomes substantially same for respective main amplifiers, 22a and 22b, because the delay circuit 28a also delays the noise in addition to the receiving signal Rx. In this case, it is preferable to adjust the timing for re-shaping the receiving signal Rx at the re-shaper 24 in connection with the selection of the control signal at the selector 23.

Figure 5:
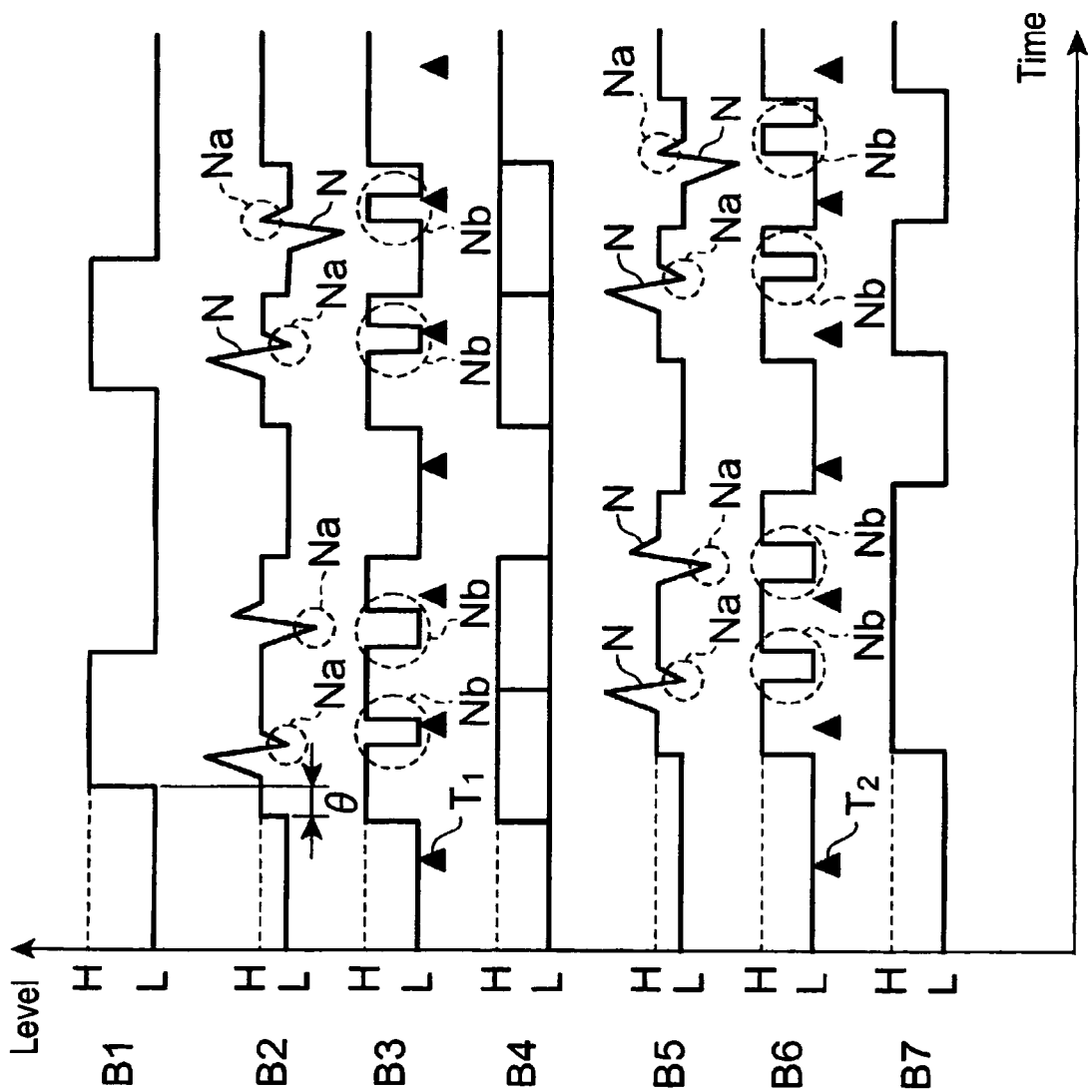
FIG. 5 shows time charts of respective signals when the noise is superposed on the receiving signal before the receiving signal is delayed.

FIG. 5 illustrates time charts of several points in the optical transceiver 1 when the noise is superposed on the receiving signal Rx before the delay circuit 28a. Charts B1 to B4 correspond to charts A1 to A4 in FIG. 4, while the chart B5 shows the receiving signal Rx at the input of the first amplifier 29a of the main amplifier 22a, the chart B6 shows the signal output from the first amplifier 29a, the chart B7 shows the signal when the output from the first main amplifier 22a is selected by the selector 23 and re-shaped at the re-shaper 24.

Even the noise is superposed on the receiving signal Rx before the delay circuit 28a, it is immutable that the noise N is generated at the leading edge or the falling edge of the transmission signal Tx. Since the receiving signal Rx is not divided into two paths, the outputs appeared in the first and second main amplifiers, 22a and 22b, have the same timing for the noise superposition within each data bit. Specifically, when the receiving signal Rx in the second main amplifier 22b superposes the noise on a center within each bit, the signal in the first main amplifier 22a superposes the noise also on a center of respective bits.

As shown in charts B3 and B6 in FIG. 5, by shifting the re-shape timing, T1 and T2, in respective charts to each other, where Ti corresponds to the timing for the signal from the first main amplifier 22a while T2 corresponds to that from the second main amplifier 22b, at least one of outputs of the main amplifiers, 22a and 22b, may be escaped from overlapping the bit portion Nb with the timing, T1 or T2. Thus, the data includes in the receiving signal Rx are reliably regenerated and re-shaped as shown in the chart B7. Although timings shown in FIG. 5 seems to be nearly same to each other, the delay circuit 28b delays the signal shown in the chart B3 like those shown in the chart B6, accordingly, the timing T1 and T2 are practically shifted.

Moreover, the present embodiment shown in FIG. 1 provides two type of main amplifiers, 22a and 22b, however, it is applicable to implement three or more main amplifiers. In such case, each main amplifier may include an amplifier for amplifying the receiving signal Rx and one of more delay circuits connected in at least one of upstream or downstream to the amplifier. The delay time of the delay circuit connected in upstream to the amplifier may be different such that the receiving signals Rx reach each amplifier with different timing, and the delay time of the delay circuit connected in downstream to the amplifier may be determined such that the receiving signal Rx passing each amplifier reaches the selector with the substantially same timing.

Second Embodiment

Figure 6:
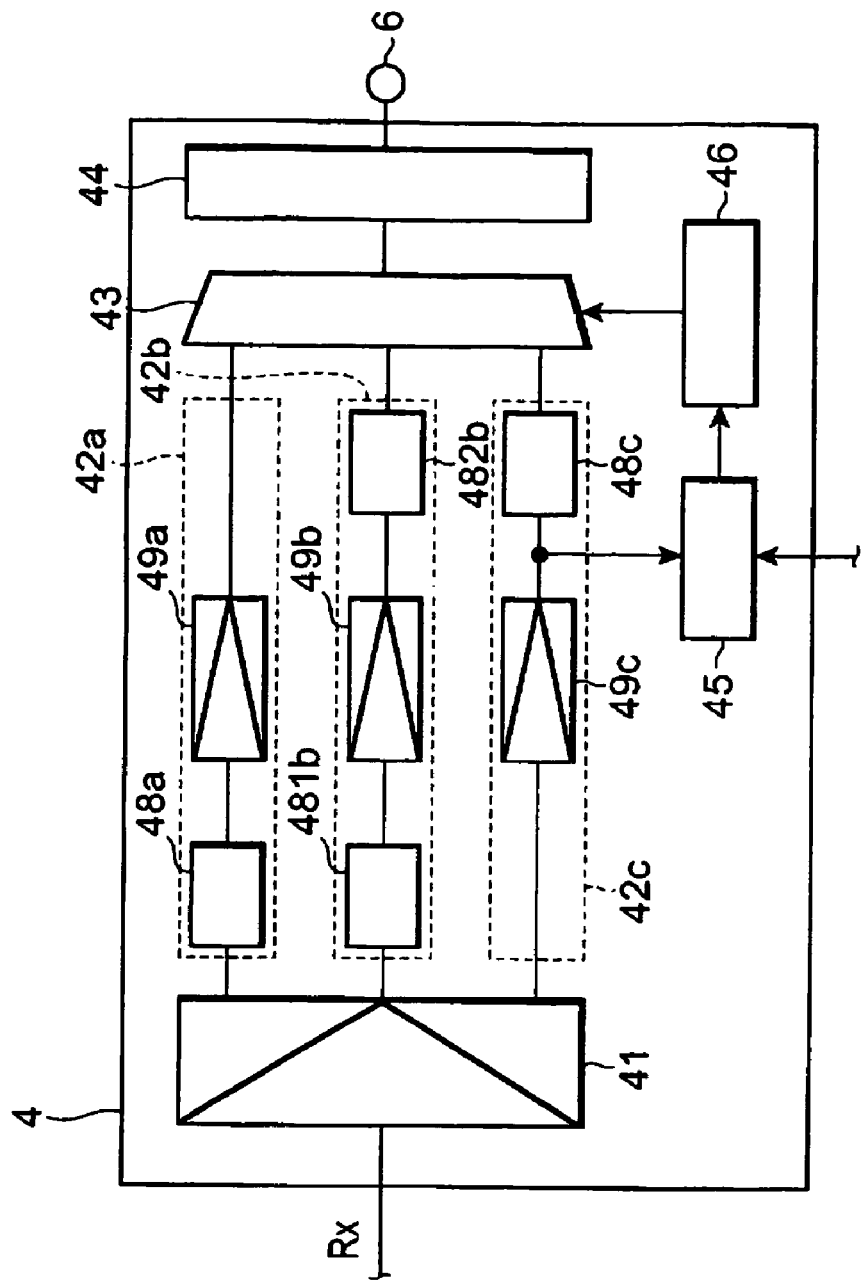
FIG. 6 is a block diagram of the optical transceiver that provides three main amplifiers each having different delay function.

FIG. 6 is a block diagram of an optical transceiver according to a modified embodiment, in which the regenerator 4 provides three main amplifiers. The regenerator 4 includes a buffer amplifier 41, three main amplifiers, 42a to 42c, a selector 43, a re-shaper 44, a phase comparator 45, and a selector controller 46. The re-shaper 44 and the phase comparator 45 have the same configuration with those, 24 and 25, previously described, so the overlapped explanation will be omitted.

The buffer amplifier 41 divides the receiving signal Rx into three main amplifiers, 42a to 42c, and each amplifies this divided receiving signal Rx. These main amplifiers, 42a to 42c, are connected in parallel to each other within the regenerator 4. The first main amplifier 42a includes a first amplifier 49a and a first delay circuit 48a connected in upstream to the first amplifier 49a to delay the receiving signal Rx by the period 2t. The second main amplifier 42b includes the second amplifier 49b, a second delay circuit 481b connected in upstream to the second amplifier 49b to delay the receiving signal Rx by the period t, a third delay circuit 482b connected in downstream to the second amplifier 49b to delay the signal by the period t. The third main amplifier 42c includes a third amplifier 49c and fourth delay circuit 48c to delay the signal by the period 2t.

In the re-generator 4 thus configured, the receiving signal Rx delays by the period 2t to reach the first amplifier 49a due to the first delay circuit 48a, while, the signal Rx delays by the period t to reach the second amplifier 49b in the second main amplifier 42b due to the second delay circuit 481b, both connected in upstream to the amplifiers, 49a and 49b. In the third main amplifier, the receiving signal Rx reaches the third amplifier without any delay. Therefore, the receiving signal Rx reaches respective main amplifiers, 49a to 49c, with different delay periods.

The delay circuits, 482b and 48c, connected in downstream to the main amplifiers, 49b and 49c, further delay the receiving signal Rx to equalize the total delay period in respective main amplifiers to be 2t. Thus, the receiving signal Rx, even passing different main amplifiers, reaches the selector 43 at substantially same timing with the delay period of 2t.

The selector 43, responding the control signal from the selector control 46, selects one of the main amplifiers, 42a to 42c. The selector control 46 generates, as previously described, the control signal depending on the phase difference between the transmitting signal Tx and the receiving signal Rx. The selector control 46 may compensate the tolerance appeared in the phase difference due to the magnitude of the optical input power and the temperature within the transceiver 1.

According to the configuration shown in FIG. 6, the re-shaper 44 may sample the receiving signal Rx so as to escape a portion superposing the noise, which reducing the degradation of the re-shaped signal due to the crosstalk from the optical transmitter 1b. The regenerator 4 shown in FIG. 6 is applicable to an optical transceiver with a multi-rate function from 155 Mbps to 2.5 Gbps. For such multi-rate optical transceiver, only two main amplifiers sometimes fail to compensate the crosstalk in effective. Three or more main amplifiers may be necessary to reduce the cross talk in effective.

Third Embodiment

Figure 7:
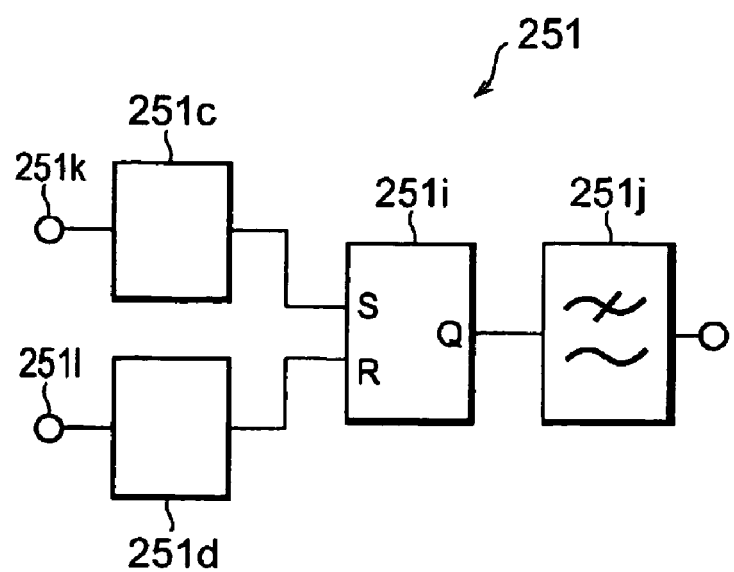
FIG. 7 is a block diagram of the phase comparator according to the second embodiment of the invention.

Next, a modification of the phase comparator 25 will be described. FIG. 7 shows a block diagram of an example of the phase comparator 251. This phase comparator 251 includes, substituting the multiplier 25f of the first embodiment, a reset/set flip-flop (RS-F/F) 251i.

The RS-F/F 251i receives a first signal from the first clock extractor 251c in the set terminal thereof, while a second signal from the second clock extractor 251d in the reset terminal thereof, where the first signal is derived from one of the receiving signal Rx and the transmitting signal Tx input via the terminal 251k, while the second signal is derived from the other of the receiving signal Rx and the transmitting signal Tx input via the terminal 251l. The output Q of the RS-F/F rises at the leading edge of the first signal at the set terminal, while falls at the leading edge of the second signal at the reset terminal.

The low-pass filter 251j, by integrating the output from the RS-F/F 25i, generates a control signal that reflects the phase difference between the receiving signal Rx and the transmitting signal Tx, and provides this control signal to the selector control 26 via the terminal 251m.

Figure 8:
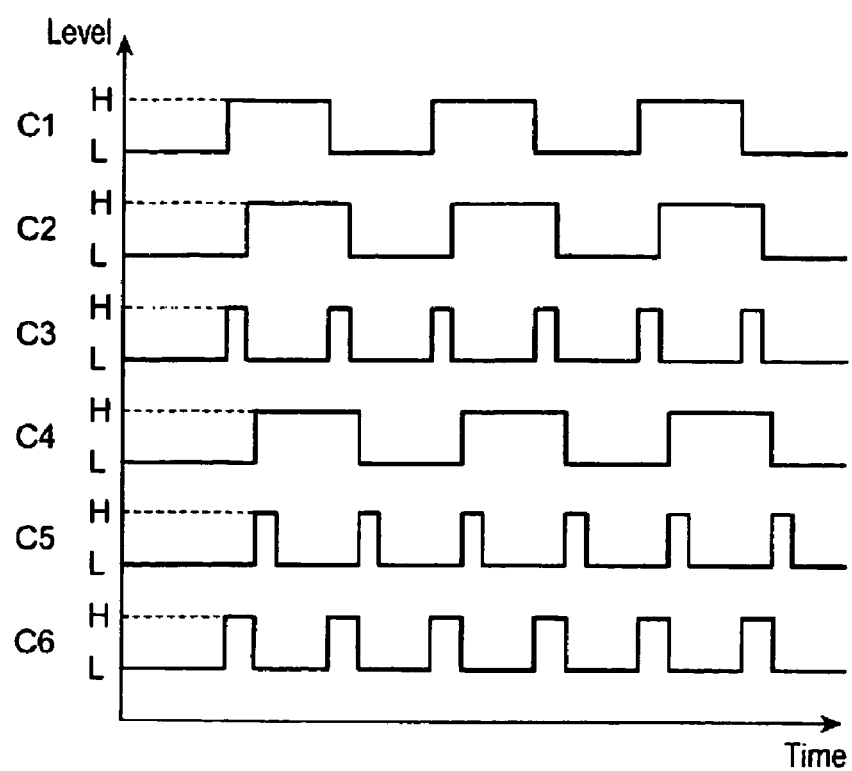
FIG. 8 shows time charts of signals of the phase comparator shown in FIG. 7.

FIG. 8 is a time chart of the phase comparator 251 shown in FIG. 7. First, the clock extractor 251c extracts the transmitting clock C3 from the transmitting signal C1 (Tx). The clock extractor 251c includes a delay circuit and an exclusive-or (EX-OR) logic circuit. That is, the clock extractor 251c delays the input signal C1 to generate the delayed signal C2, and carries out the Exclusive-OR logic for these two signals, C1 and C2, to generate the clock signal C3 that is provided to the set terminal of the RS-F/F 251i. When the transceiver installs the input terminal for the transmitting clock Tx independently, this clock signal input thereto is directly provided to the set terminal by bypassing the clock extractor 251c.

For the receiving data Rx shown in chart C4, the second clock shown in the chart C5 is generated by the same manner with the first clock extractor and provided to the reset terminal of the RX-F/F 251c.

At the RS-F/F 251i, the output thereof is set at the leading edge of the transmitting clock C3 and falls at the leading edge of the receiving clock C5 to generate the signal C6 that reflects the phase difference between the transmitting signal C1 and the receiving signal C4, as already described.

Fourth Embodiment

Figure 9:
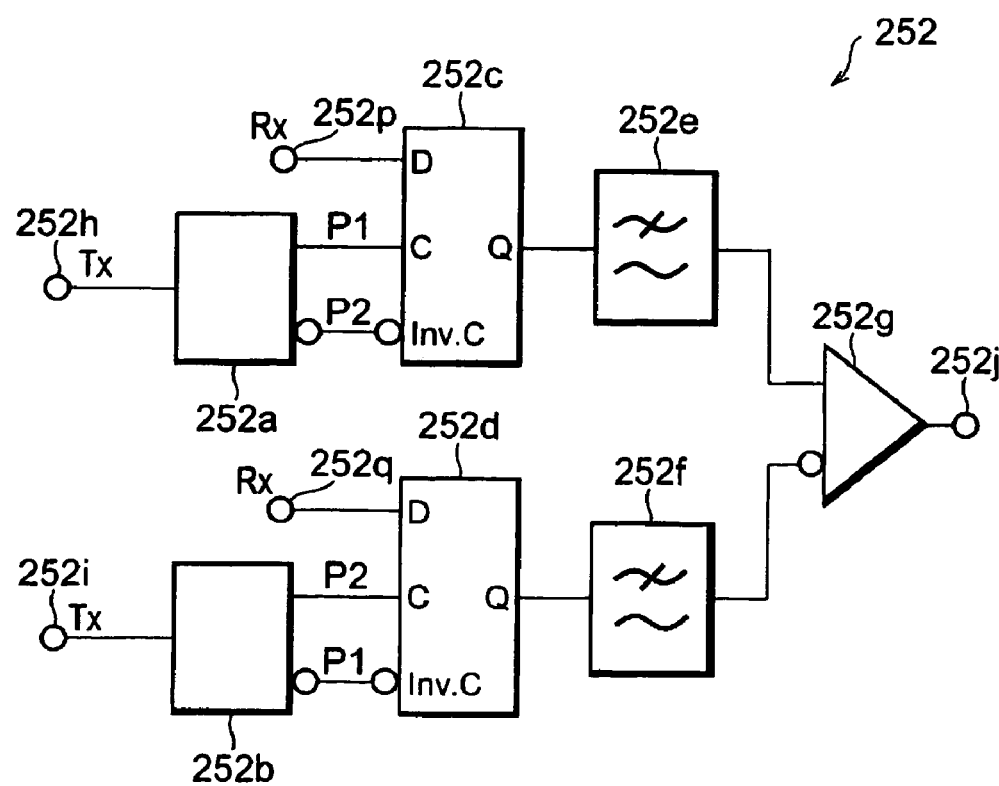
FIG. 9 is a block diagram of the phase comparator according to the third embodiment.

FIG. 9 shows another embodiment of the phase comparator 252. This phase comparator 252 provides two clock extractors, 252a and 252b, two circuits, 252c and 252d, two filters, 252e and 252f, and a comparator 252g. The clock extractors, 252a and 252b, have the same configuration with those, 251c and 251d, shown in FIG. 7 except that the extractors, 252a and 252b, in the present embodiment has two outputs, P1 and P2, complementary to each other. The extractors, 252a and 252b, by receiving the transmitting signal Tx at the input terminals, 252h and 252i, generates the transmitting clocks, P1 and P2, that synchronizes with the transmitting signal Tx and provides them to the circuit 252c as a normal phase clock. Where the transmitting clock, P1 and P2, are complementary to each other, that is, the phase of the clock P2 is opposite to that of the clock P1.

The other clock extractor 252b, also by receiving the transmitting signal Tx, generates the transmitting clocks, P1 and P2, complementary to each other, and provides them to the other circuit 252d. However, for the extractor 252b, the anti-phase clock P2 is input to the normal phase input of the circuit 252d, while the in-phase clock P1 is input to the anti-phase input thereof. Moreover, both circuits, 252c and 252d, receive the receiving signal Rx in the D-input thereof via the inputs, 252p and 252q, which are connected to the amplifier 29b shown in FIG. 1.

Figure 10:
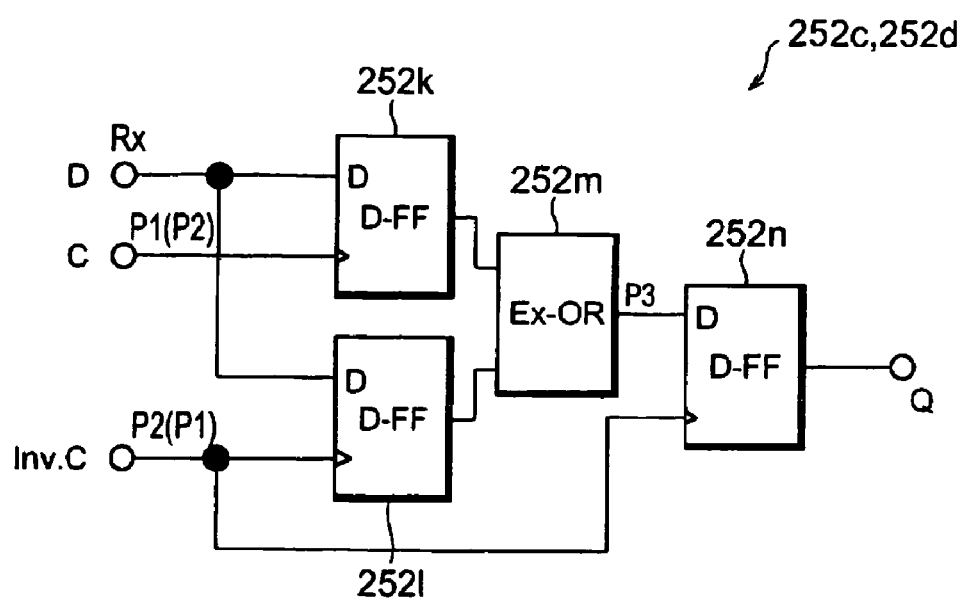
FIG. 10 shows a block diagram of the circuit used in the phase comparator shown in FIG. 9.

FIG. 10 shows the inner configuration of the circuits, 252c and 252d, which are the same configuration. The circuits, 252c and 252d, include three D-F/Fs, 252k, 252l, and 252n, and one EX-OR logic, 252m.

The D-input of two D-F/Fs, 252k and 252l, receive the receiving signal Rx, while the clock input of the first D-F/F 252k receives the in-phase clock P1 in the circuit 252c and the clock input of the second D-F/F 252l receives the anti-phase clock P2. The output of the first D-F/F 252k and the output of the second D-F/F 252l are led to the EX-OR 252m. The output of the EX-OR 252m is led to the D-input of the third D-F/F 252n, while the clock input thereof receives the anti-phase clock P2.

Figure 11:
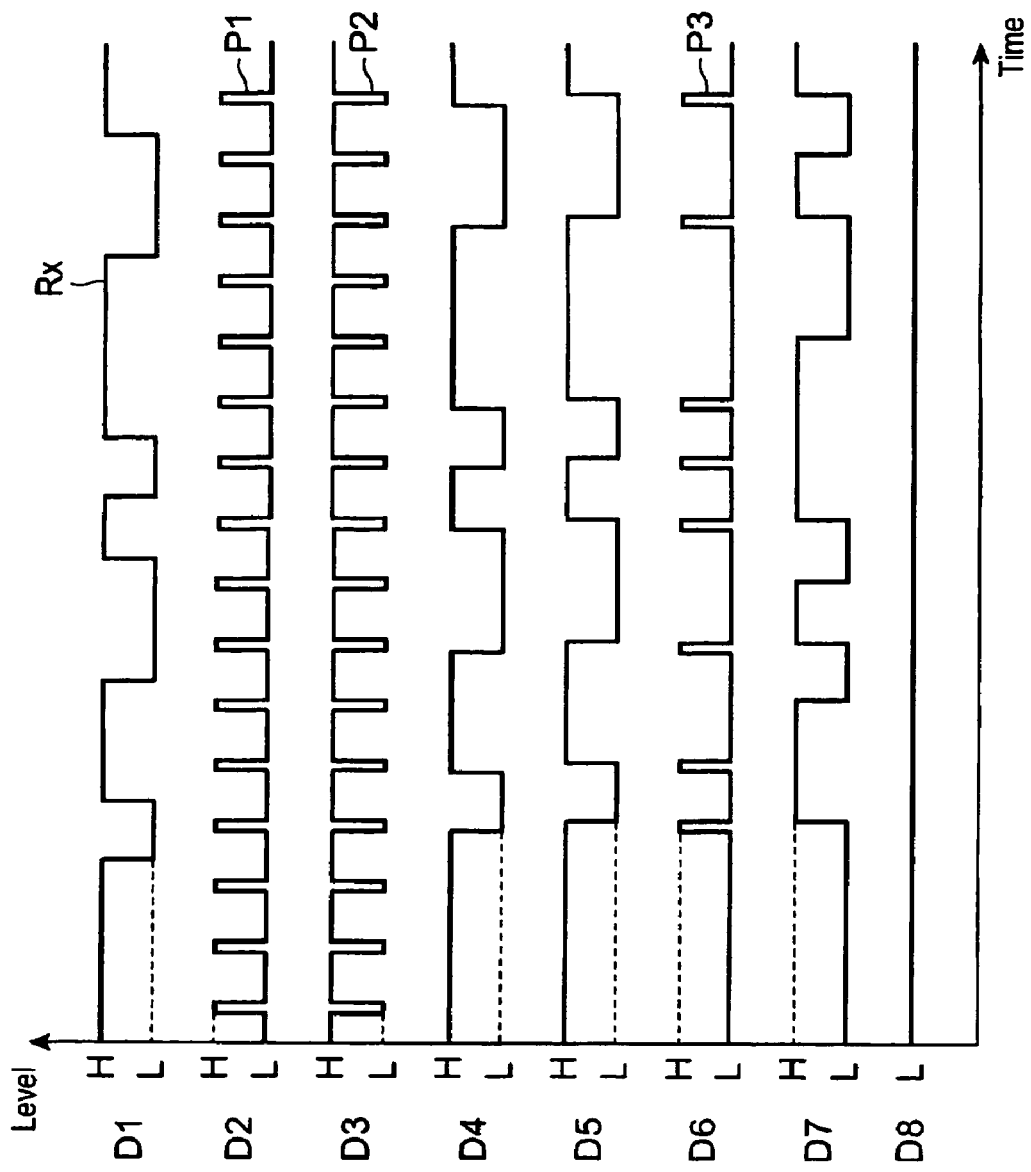
FIG. 11 shows time charts of respective signals within the circuit shown in FIG. 10.

FIG. 11 is a time chart of the circuits, 252c and 252d, shown in FIG. 10. The chart D1 shows an example of the receiving data Rx input in the D-input of the first and second D-F/Fs, 252k and 252l. The chart D2 is the in-phase clock P1 input to the clock input of the first D-F/F 252k, while the chart C3 denotes the anti-phase clock P2 input to the second and third D-F/Fs, 252l and 252n.

The first D-F/F 252k outputs a signal D4 that re-shapes the receiving signal Rx (D1) by the in-phase clock D2, and the second D-F/F 252l outputs another signal D5 that re-shapes the receiving signal Rx (D1) by the anti-phase clock D3. The phases of these two signals, D4 and D5, are different by the width of the in-phase clock P1, and are led to the EX-OR logic 252m. Although the in-phase and anti-phase clocks shown in D2 and D3 have a duty ratio smaller than 50%, these clocks may have the duty ratio of 50%.

The outputs of two D-F/Fs, 252k and 252l, are performed in the exclusive-or function by the EX-OR logic 252m, as shown in the chart D6, and is provided to the D-input of the third D-F/F 252n. At the third D-F/F 252n, this output of the EX-OR logic 252m is re-shaped by the leading edge of the anti-phase clock D3 to generate the signal shown in chart D7.

On the other hand, the circuit 252d generates another signal D8 by re-shaping the output of the EX-OR 252m by the leading edge of the in-phase clock D2. However, the output signal D6 from the EX-OR 256m fully overlaps with the in-phase clock D2 in FIG. 11, the re-shaped signal output from the third D-F/F 256n continues the "L" level.

The difference in the output signals between the circuits 252c and 252d depends on whether the transition timing of the receiving signal Rx (D1) occurs at which state, the level "H" or "L", of the in-phase clock D2. That is, in an example shown in FIG. 11, since the receiving signal Rx (D1) changes its state when the in-phase clock D2 is in the "L" level, the output from the circuit 252c changes the level, while the output from the circuit 252d continues the "L" level. On the other hand, when the receiving signal Rx (D1) changes when the in-phase clock D2 is in the "H" level, the output from the circuit 252d changes the level thereof and that from the circuit 252c continues the level "L".

Referring to FIG. 9 again, the output from the circuit 252c is integrated by the filter 252e, and that from the circuit 252d is similarly integrated by the filter 252f. The comparator 252g compares these integrated signals output from respective filters, 252e and 252f. That is, the transition of the receiving signal Rx occurs at which states, "H" or "L", of the in-phase clock P1 that is derived from the transmitting signal Tx, that is, it is compared whether the difference in the phase between the receiving signal Rx and the transmitting signal Tx is greater than the pulse width of the in-phase clock P1. The result of the comparison is sent to the selector control 26, shown in FIG. 1, via the output terminal 252j.

According to the phase comparator 252 thus configured, the phase of the receiving signal Rx and that of the transmitting signal Tx may be compared. That is, although the phase comparator 252 does not measure the exact phase difference between them, the comparator 252 detects the phase difference compared to a reference value, the pulse width of the in-phase clock P1. In the optical transmitter shown in FIG. 1, the selector 23 only selects one of the main amplifiers, 22a and 22b. Accordingly, the phase comparator 252 may fulfill its role only by comparing the phase difference between two signals.

Moreover, the phase comparator is unnecessary to extract the receiving clock from the receiving signal Rx, which simplifies the configuration of the optical transmitter.

Fifth Embodiment

Figure 12:
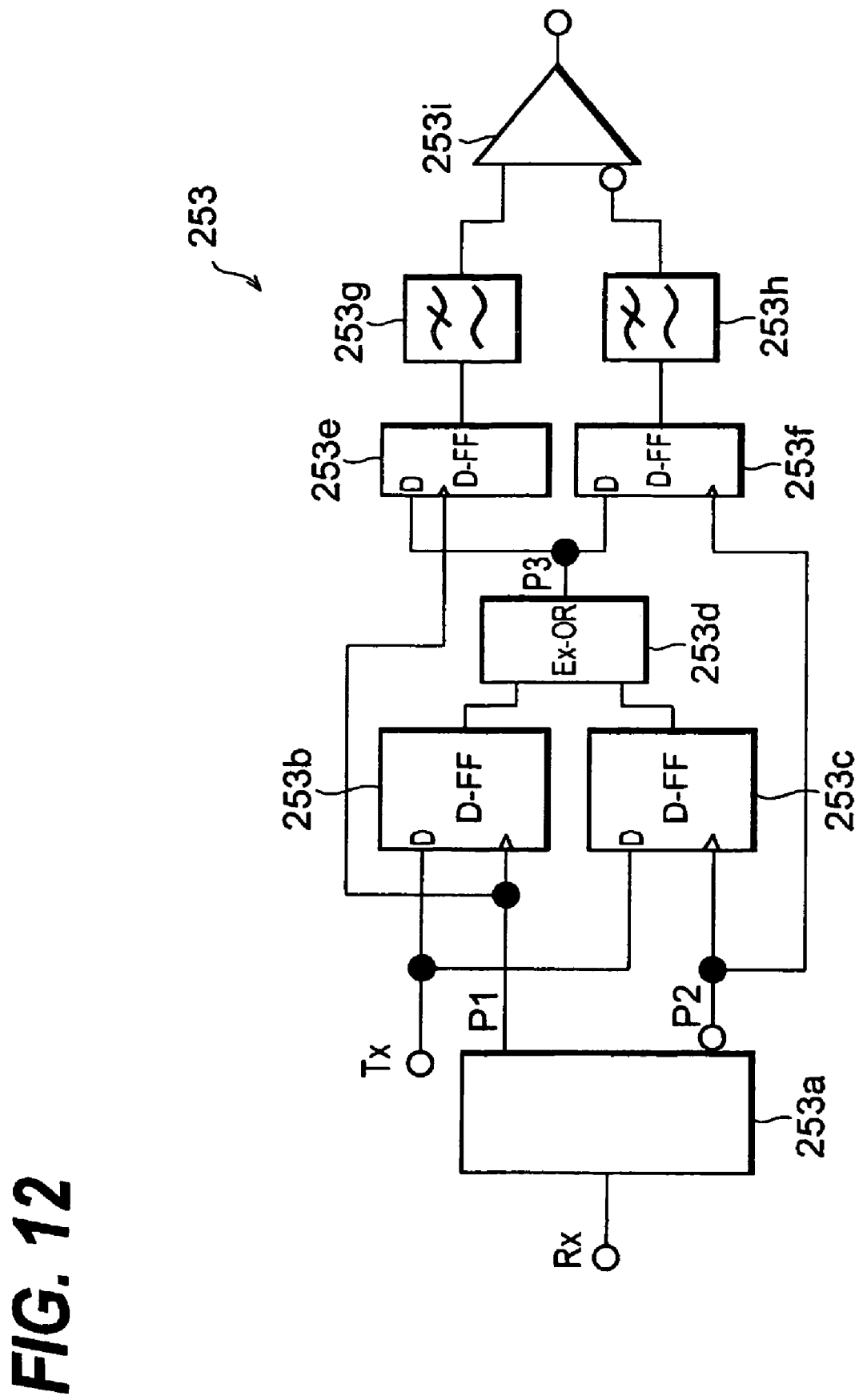
FIG. 12 is a block diagram of the phase comparator according to the fourth embodiment.

FIG. 12 shows a block diagram of still another phase comparator. This comparator 253 has a simplified configuration of that shown in FIG. 9.

The comparator 253 comprises a clock extractor 253a, first two D-F/Fs, 253b and 253c, an EX-OR logic 253d, second two D-F/Fs, 253e and 253f, two filters, 253g and 253h, and a comparator 253i. The clock extractor 253a extracts the clock from the transmitting signal Tx. The rest block, namely, the two D-F/Fs, 253b and 253c, the EX-OR logic 253d, the two D-F/Fs, 253e and 253fm, two filters, 253g and 253h, and the comparator 253i, constitute a level decision circuit that, by receiving the in-phase or anti-phase clocks, P1 or P2, from the clock extractor, decides the level of the clock when the receiving signal Rx changes its level. The clock extractor 253a is the same with that 252a shown in FIG. 9 in the constitution and the function thereof, the first two D-F/Fs, 253b and 253c are the same with those 252k and 252l in FIG. 10, and the EX-OR logic 253d is the same with that 252m in FIG. 10.

The second two D-F/Fs, 253e and 253f, have the same function with those D-F/Fs, 252n and 252d, shown in FIG. 10, respectively. That is, the D-input of the each D-F/F, 253e or 253f, receives the output from the EX-OR logic 253d, while the clock input of the D-F/F 253e receives the in-phase clock P1 from the clock extractor 253a, while the clock input of the other D-F/F 253f receives the anti-phase clock P2 from the extractor 253a.

The outputs of respective D-F/Fs are compared by the comparator 253i after integrated by the filters, 253g and 253h. The phase comparator 253 decides that the change of the receiving signal Rx occurs at the in-phase clock P1 is in the level "H" or "L", which means whether the phase difference between the receiving signal Rx and the transmitting signal Tx becomes greater than the pulse width of the in-phase clock P1. The result of the comparison is sent from the comparator to the selector control 26.

According to the phase comparator 253, the phase difference between the receiving signal Rx and the transmitting signal Tx may be compared by a simpler circuit configuration.

Sixth Embodiment

Figure 13:
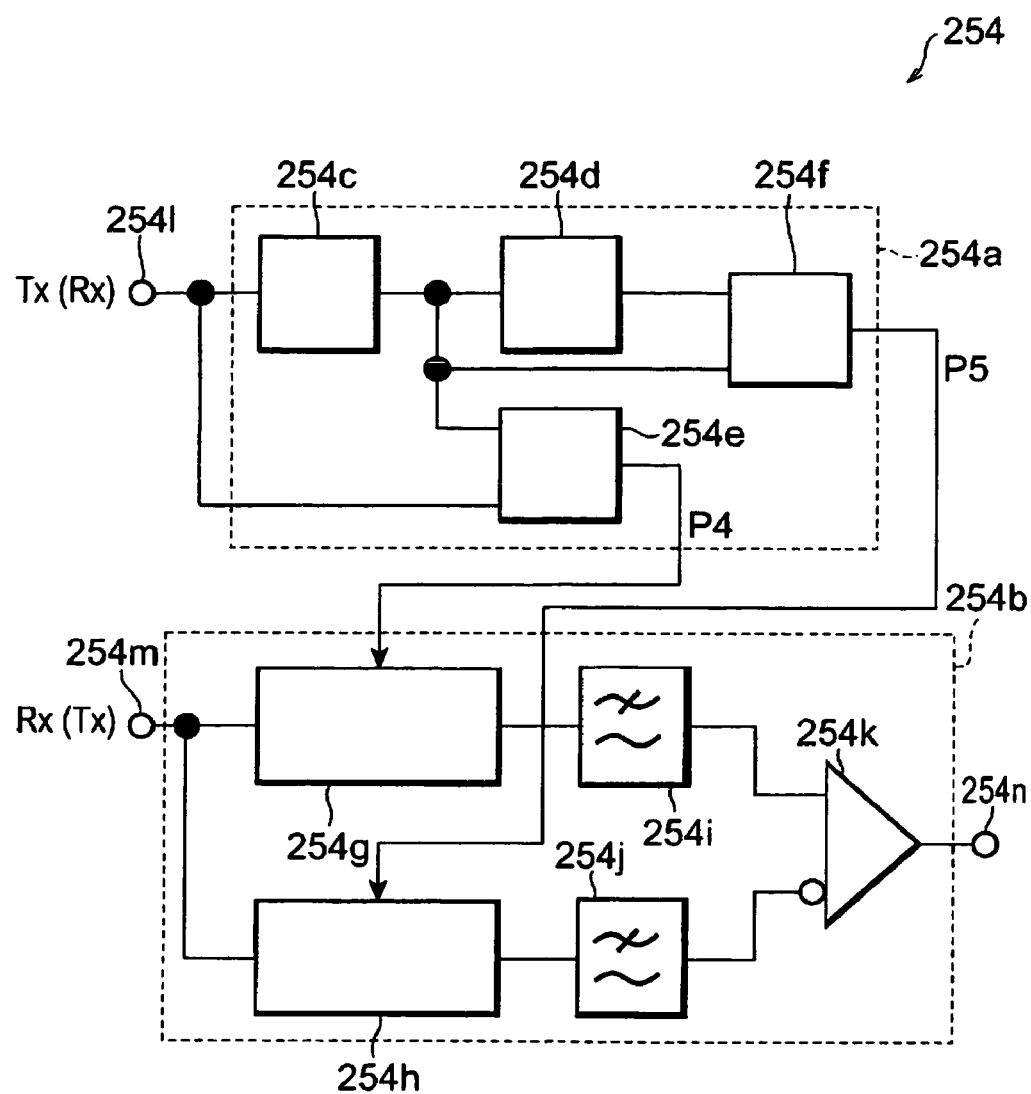
FIG. 13 is a block diagram of the phase comparator according to the fifth embodiment.

FIG. 13 is a block diagram showing still another phase comparator 254. This phase comparator 254 comprises the clock extractor 254a and the decision circuit 254b. The clock extractor 254a generates the first pulse train P4 synchronized with the transmitting signal Tx and the second pulse train P5 delayed by the pulse width of the first pulse train P4. The decision circuit 254b decides the level of the first and second pulse train, P4 and P5, when the receiving signal Rx changes the level thereof.

Specifically, the clock extractor 254a includes two delay circuits, 254c and 254d, and two EX-OR logics, 254e and 254f. The first delay circuit receives the transmitting signal Tx via the terminal 254l and delays the transmitting signal Tx by T0/2, where T0 is the bit width of the transmitting signal Tx. The second delay circuit 254d delays the signal delayed by the first delay circuit 254c by T0/2. The signal output from the second delay circuit 254d is delayed by T0 compared with the transmitting signal Tx.

The decision circuit 254b includes two circuits, 254g and 254h, two filters, 254i and 254j, and a comparator 254k. The circuit 254g receives the receiving signal Rx and the first pulse train P4, and outputs a signal with the "H" level from the leading edge of the first pulse train P4 only when the receiving signal Rx changes the level thereof between the leading edge of the first train P4 and the falling edge just after the leading edge of the first pulse train P4. The function of the other circuit 254h is the same with the circuit 254g explained above except that the circuit 254h receives the second pulse train P5 and outputs another signal with the "H" level from the leading edge of the second clock P5 when the relation between the second pulse train P5 and the receiving signal Rx explained above is satisfied.

Two filters, 254i and 254j, integrate the output of the circuits, 254g and 254h, and the comparator 254k compares the signals from two filters, 25i and 254j. The output of the comparator 254k is provided to the selector control 26 shown in FIG. 1.

Figure 14:
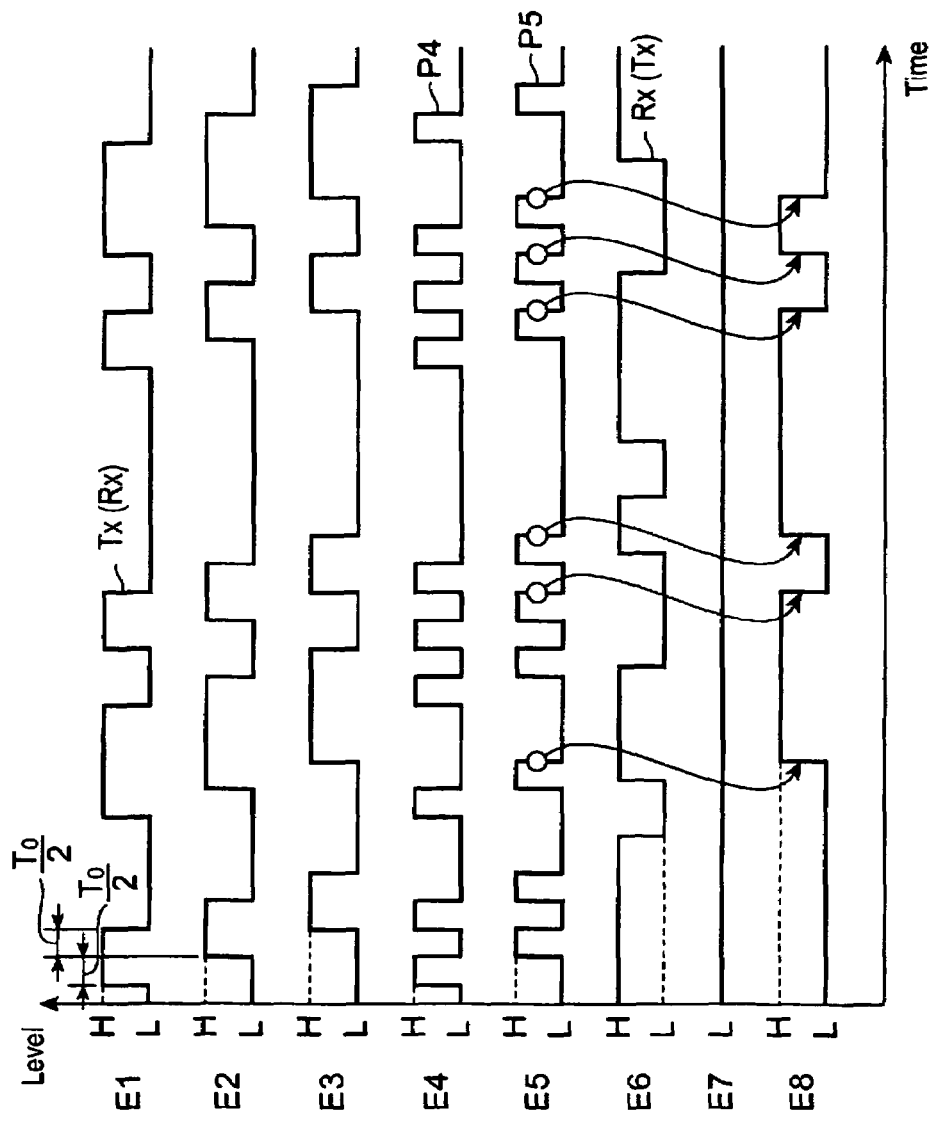
FIG. 14 shows time charts of respective signal of the phase comparator shown in FIG. 13.

FIG. 14 shows timing charts of the phase comparator 254 shown in FIG. 13. The transmitting signal TX, which corresponds to the chart E1, is input to the clock extractor 254a. The delay circuit 254c delays this transmitting signal Tx by T0/2 shown in the chart E2. Another delay circuit 254d further delays this delayed signal (E2) by T0/2 shown in the chart E3.

The first EX-OR logic 254e performs the exclusive-or operation for signals shown in the charts E1 and E2 to generate the first pulse train P4 shown in the chart E4, while the other EX-OR logic 254f performs the exclusive-or operation for the signals shown in charts E2 and E3 to generate the second clock P5 in the chart E5. The second clock P5 (E5) is delayed by T0/2 with respect to the first clock P4 (E4).

In the first circuit 254g, an operation is carried out for two signals, the first pulse train P4 shown in the chart E4 and the receiving signal Rx shown in the chart E6, that is, only when the receiving signal Rx changes its level between two timings, namely, the falling edge and the leading edge just before the falling edge above of the first pulse train P4, the first circuit 254g sets its output to be "H" from the falling edge of the first pulse train P4. Similarly, the second circuit 254h, by receiving the second pulse train P5 and the receiving signal Rx, changes its output shown in the chart E5 to be the level "H" from the falling edge of the second pulse train P5.

In the example shown in FIG. 14, since the level of the receiving signal Rx does not change its level between the falling edge and the leading edge just before thereof of the first pulse train P4, the first circuit 254g continues the output thereof to be the "L" level, which is shown in the chart E7. On the other hand, for the second circuit 254h, the receiving signal Rx changes its level between the falling edge and the leading edge just before the falling edge, accordingly, the output thereof shown in the chart E5 changes to the "H" level by from the falling edge of the second pulse train P5.

The filters, 254i and 254j, integrate these outputs from the circuits, 254g and 254h, and the comparator 254k compares the integrated outputs to decide whether the change of the receiving signal Rx occurs in the front half of the transmission signal Tx or in the latter half thereof. In other words, whether the receiving signal Rx delays with respect to the transmission signal Tx more than half of the bit width or not is evaluated. In the example shown in FIG. 14, the output from the filter 254j is greater than that from the other filter 254i. Accordingly, the change in the receiving signal Rx primarily occurs in the latter half of the bit width in the transmission signal Tx. Finally, the comparison result is sent to the selector control 26.

Thus, according to the phase comparator 254 shown in FIG. 13, the phase difference between the receiving signal Rx and the transmitting signal Tx can be determined. That is, although the phase comparator 254 does not define the exact phase difference, the comparator 254 may determine whether the phase difference is greater than a preset value, a half period of the bit width in the embodiment shown in FIG. 13. Accordingly, the selector may exactly select one of the main amplifiers.

Moreover, the phase comparator 254 is not necessary to provide the clock extractor for the receiving signal Rx, which may simplify the circuit.

The phase comparator 254 may further comprise another delay circuit before the delay circuit 254c. The additional delay circuit may optionally adjust the width of the first and second clocks, P4 and P5, which enables for the phase comparator 254 to be applied to a specific communication protocol that dynamically changes its bit rate.

The optical transceiver according to the present invention is not restricted to those shown as exemplary embodiments, and many other modifications may be applicable. For instance, although the embodiment above divides the selector control 26 from the selector 23, two blocks may be integrally built on the single block. Moreover, although the receiving signal Rx is divided from just after the second main amplifier, it may be possible for the receiving signal Rx to be divided from just after the first main amplifier or a main amplifier prior to the division to respective main amplifiers.

What is claimed is:

1. An optical transceiver, comprising:
    an optical transmitter including a semiconductor light-emitting device that converts a transmitting signal synchronized with a transmitting clock into an transmitting optical signal; and
    an optical receiver including a semiconductor light-receiving device that converts a receiving optical signal into a receiving signal and a plurality of main amplifiers, each main amplifier receiving the receiving signal and including an amplifier and a delay circuit connected in at least one of upstream and downstream to the amplifier, the delay circuit delaying the receiving signal such that, when the delay circuit connected in upstream to the amplifier, the amplifiers in respective main amplifiers receive the receiving signal with timing different from each other, and, when the delay circuit connected in downstream to the amplifier, each main amplifier outputs the receiving signal with substantially same timing to each other;
    a phase comparator, by receiving the receiving signal, for comparing a phase of the transmitting signal and a phase of the receiving signal and for outputting a selector control signal; and
    a selector connected to each main amplifier, the selector selecting one of the main amplifiers based on the selector control signal.

2. The optical transceiver according to claim 1, further comprising a monitor circuit for monitoring magnitude of the receiving optical signal,
    wherein the selector selects one of the main amplifiers based on the output from the monitor circuit.

3. The optical transceiver according to claim 1, further comprising a monitor circuit for monitoring a temperature within the optical transceiver,
    wherein the selector selects one of the main amplifiers based on the output from the monitor circuit.

4. The optical transceiver according to claim 1, wherein the phase comparator includes
    a first clock extractor for extracting the transmitting clock from the transmitting signal,
    a second clock extractor for extracting the receiving clock from the receiving signal,
    a set-reset flip-flop configured to receive one of outputs from the first clock extractor and the second clock extractor in a set terminal thereof, and configured to receive the other of outputs from the first clock extractor and the second clock extractor in a reset terminal thereof, and
    a filter for integrating an output of the set-rest flip-flop.

5. The optical transceiver according to claim 1, wherein the phase comparator includes a level decision circuit configured to decide a level of the transmitting clock when a level of the receiving signal output from one of the amplifiers changes.

6. The optical transceiver according to claim 5, wherein the phase comparator further includes a clock extractor for extracting a transmitting clock from the transmitting signal.

7. The optical transceiver according to claim 1, wherein the phase comparator includes two clock extractors connected in series and two level decision circuits each corresponding to the clock extractor, the first clock extractor generates a first pulse train with a first pulse width smaller than a bit width of the transmitting signal and triggered by a leading edge of the transmitting signal, the second clock extractor generating a second pulse train with a pulse width smaller than the bit width of the transmitting signal and triggered by a falling edge of the first pulse train, each level decision circuit deciding whether the receiving signal changes the level during a falling edge and a leading edge immediately before the falling edge of the pulse train output from the corresponding clock extractor, and setting an output of the level decision circuit to be a high level with a preset period.

8. The optical transceiver according to claim 7, wherein the pulse width of the pulse train generated by the clock extractors except for the first pulse extractor is variable.

* * * * *